(12) United States Patent
Eslambolchi et al.

(10) Patent No.: US 6,700,380 B1
(45) Date of Patent: Mar. 2, 2004

(54) METHOD AND APPARATUS FOR SIDE LEG UTILITY CONVEYANCE

(75) Inventors: Hossein Eslambolchi, Los Altos Hills, CA (US); John Sinclair Huffman, Conyers, GA (US); James F Kirkpatrick, Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/078,686

(22) Filed: Feb. 19, 2002

(51) Int. Cl.[7] .............................. G01V 3/08; G01V 3/11; G01R 19/00
(52) U.S. Cl. .......................................... 324/326; 324/67
(58) Field of Search ........................ 324/67, 326, 329, 324/529, 66; 361/111, 119, 120; 379/28

(56) References Cited

U.S. PATENT DOCUMENTS

| | | | |
|---|---|---|---|
| H1217 H | * 8/1993 | Phelps | 324/67 |
| 5,361,029 A | * 11/1994 | Rider et al. | 324/326 |
| 5,644,237 A | 7/1997 | Eslambolchi et al. | |
| 6,100,699 A | * 8/2000 | Eslambolchi et al. | 324/529 |
| 6,154,032 A | * 11/2000 | Coia et al. | 324/424 |
| 6,222,358 B1 | * 4/2001 | Wottrich | 324/67 |
| 6,292,344 B1 | * 9/2001 | Glaser et al. | 361/119 |
| 6,351,126 B1 | * 2/2002 | Belew et al. | 324/326 |

OTHER PUBLICATIONS

U.S. patent No. 6,351,126, Hossein Eslambolchi et al., issued Feb. 26, 2002.

* cited by examiner

*Primary Examiner*—N. Le
*Assistant Examiner*—Darrell Kinder

(57) ABSTRACT

To locate via electromagnetic signaling each of a plurality of buried side leg conveyances ($14_1$–$14_6$) coupled to a common underground backbone conveyance (12), a cable locating signal generator (17) applies a plurality of different frequency conveyance locating signals to the backbone conveyance. A separate one of a plurality of filter arrestors ($18_1$–$18_6$) selective passes a particular one of the plurality of different frequency locating signals onto a corresponding one of the side leg conveyances. In this way, each side leg conveyance carries only a particular frequency locating signal whose strength remains unaffected by the locating signal on the other side leg conveyances.

6 Claims, 2 Drawing Sheets

METHOD AND APPARATUS FOR SIDE LEG UTILITY CONVEYANCE

TECHNICAL FIELD

This invention relates to a technique for selectively locating a short haul cable or pipe (a utility conveyance) that runs off a main conveyance.

BACKGROUND ART

Many utilities, such as AT&T, bury their pipes and cables ("utility conveyances") underground both for reasons of safety and esthetics. Underground burial often provides protection to such utility conveyances against weather and other sources of potential damage. Utilities that undertake burial of their conveyances usually make extensive efforts to plot the location of each buried conveyance on a map to facilitate its location in case of repair or replacement. While a map will indicate the general location of a buried conveyance, more precise location information often becomes necessary, particularly in urban environments. For that reason, most utilities that bury their conveyances underground typically rely on electromagnetic signaling techniques to precisely locate such conveyances.

U.S. Pat. No. 5,644,237, issued in the names of Hossein Eslambolchi and John Huffman, on Jul. 1, 1997, and assigned to AT&T, (incorporated by reference herein) discloses an electromagnetic signaling technique for locating a buried utility conveyance. A signal generator applies a locating signal and a confirmation signal to a metallic part of the conveyance. In the case of an optical fiber cable, the metallic part comprises either a metallic sheath or a copper trace wire within the cable. Using a signal detector, a technician detects both the locating signal and the confirmation signal radiated above ground to precisely locate the buried conveyance.

Conveyance location via electromagnetic signaling works well for long haul conveyances. However, some conveyance routes, and in particular, certain fiber cable routes in urban areas, include one or more short haul cables ("side-leg") cables that run between a long haul (backbone) cable and a telecommunications facility. Each side leg cable connects the metallic sheath of the backbone cable to ground, thus allowing the locating signal on the backbone cable to pass into the side leg cable. All other considerations being equal, a side leg cable having a smaller impedance (i.e., a shorter signal path to the cable locating signal generator) will radiate a higher strength locating signal. Conversely, the side leg cable having a larger impedance (i.e., a longer signal path to the cable locating signal generator) will radiate a lower strength locating signal, making locating of such a side leg cable more difficult. In the past, overcoming the problem of a low-strength locating signal on a side leg cable required the addition of a separate locating signal generator for that side leg. Such locating signal generators are expensive, and adding a separate locating signal generator for each side leg will greatly increase costs.

Thus, there is a need for a technique that enables accurate location of each of a plurality of side leg cables by means of electromagnetic signaling without the need for a separate locating signal generator for each side leg.

BRIEF SUMMARY OF THE INVENTION

Briefly, in accordance with a preferred embodiment, there is provided a method for selectively applying a conveyance-locating signal to each of a plurality of short haul (side leg) underground utility conveyances, each coupled to a backbone conveyance. In accordance with the method, a conveyance-locating signal generator applies a plurality of different frequency conveyance-locating signals on the backbone conveyance. A notch filter, comprising part of a filter arrestor assembly, connects each short haul conveyance to ground for selectively passing a particular frequency locating signal only. In this way, each short haul conveyance carries a locating signal of a particular frequency whose strength remain unaffected by locating signals on the other short haul conveyances.

DETAILED DESCRIPTION

Figure 1:
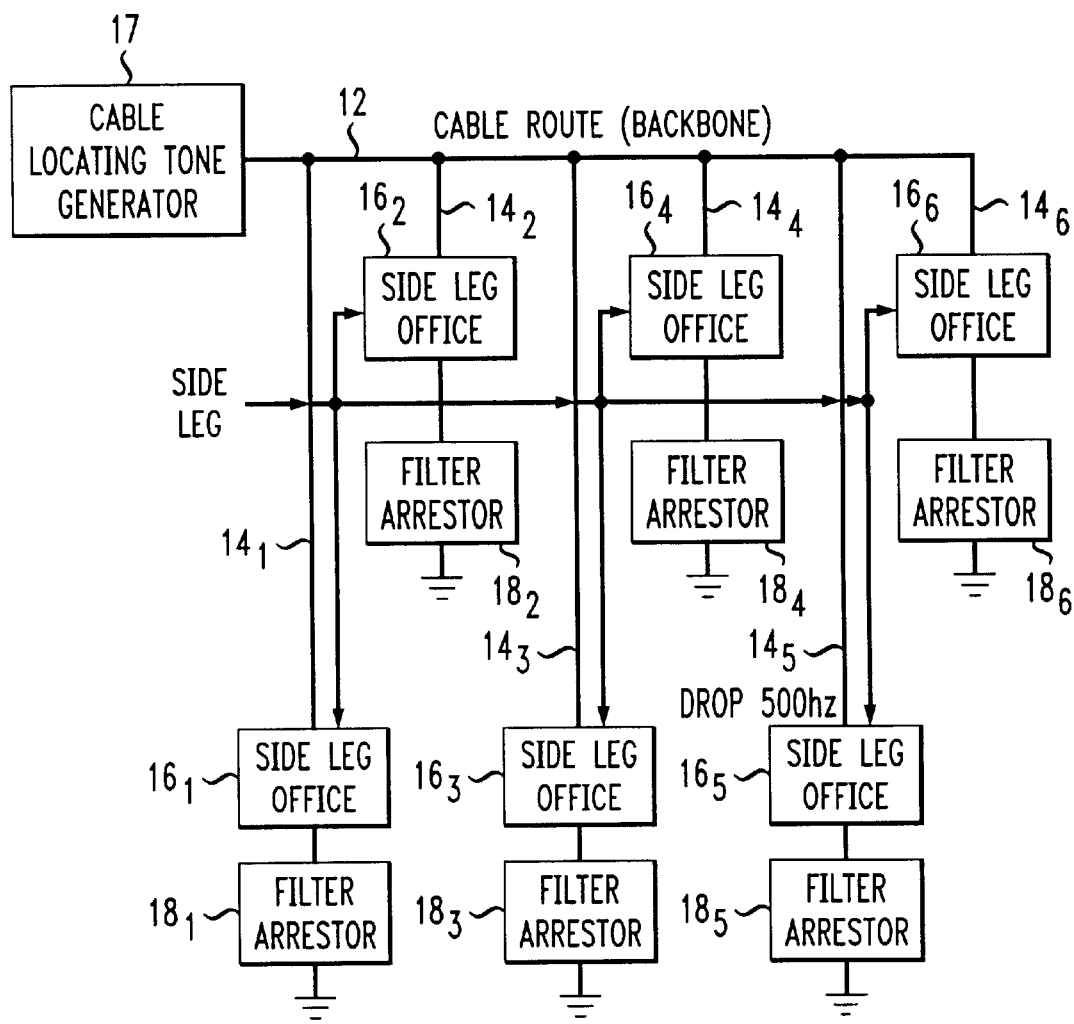
FIG. 1 illustrates a block schematic diagram of cable route that includes a plurality of filter arrestors in accordance with the invention for selectively passing only a particular frequency locating signal on each side leg conveyance.

FIG. 1 depicts an exemplary telecommunications cable route 10 that includes a long haul (backbone) cable 12 that typically, although not necessarily, comprises a optical fiber cable that carries one or more individual optical fibers and a metallic member in the form of a sheath (not shown). A plurality of short haul ("side leg") cables, best exemplified by side leg cables $14_1$, $14_2$, $14_3$, $14_4$, $14_5$, and $14_6$, each run from the backbone cable to a separate one of side leg telecommunications facilities ("offices") $16_1$–$16_6$, respectively. Although the illustrated embodiment depicted in FIG. 1 includes six separate side leg cables and corresponding side leg offices, the cable route 10 could include a larger or smaller number of side leg cables and corresponding side leg offices.

To facilitate the location of each of the side leg cables $14_1$–$14_6$ via electromagnetic signaling, a cable locating tone (signal) generator 17 provides a cable-locating signal on the metallic member of the backbone cable 12. Assuming a good sheath bond between the backbone cable 12 and a first end of each of the side leg cables $14_1$–$14_6$, the cable locating tone on the backbone cable will pass into each of the side leg cables, each having its opposite end coupled to ground by a separate of filter arrestors $18_1$–$18_6$, respectively.

Assuming a single frequency locating signal on the backbone cable 12, the strength of the cable locating signal on a given side leg cable will depend on its impedance, as measured between the cable locating signal generator 17 and ground. Thus, all other factors equal, a shorter side leg cable (e.g., side leg cable $14_2$) would radiate a higher strength cable locating signal as compared to a longer side leg cable (e.g., side leg cable $14_3$). Heretofore, locating a long side leg cable proved problematic because of the low strength cable locating signal on that cable.

In accordance with present principles, the problem of a low strength locating signal on one or more side leg cables is overcome by: (1) employing a cable locating signal generator 17 that generates a plurality of different frequency locating signals, and (2) modifying the filter arrestors $18_1$–$18_6$ so each has the capability of passing a separate one of a plurality of different frequency cable locating signals. By selectively passing a particular one of the different frequency locating signals on the backbone conveyance 12 onto its associated side leg cable, each of the filter arrestors $18_1$–$18_6$, assures that the strength of that frequency locating signal on that side leg cable remains unaffected by the locating signal on each of the other side leg cables.

Figure 2:
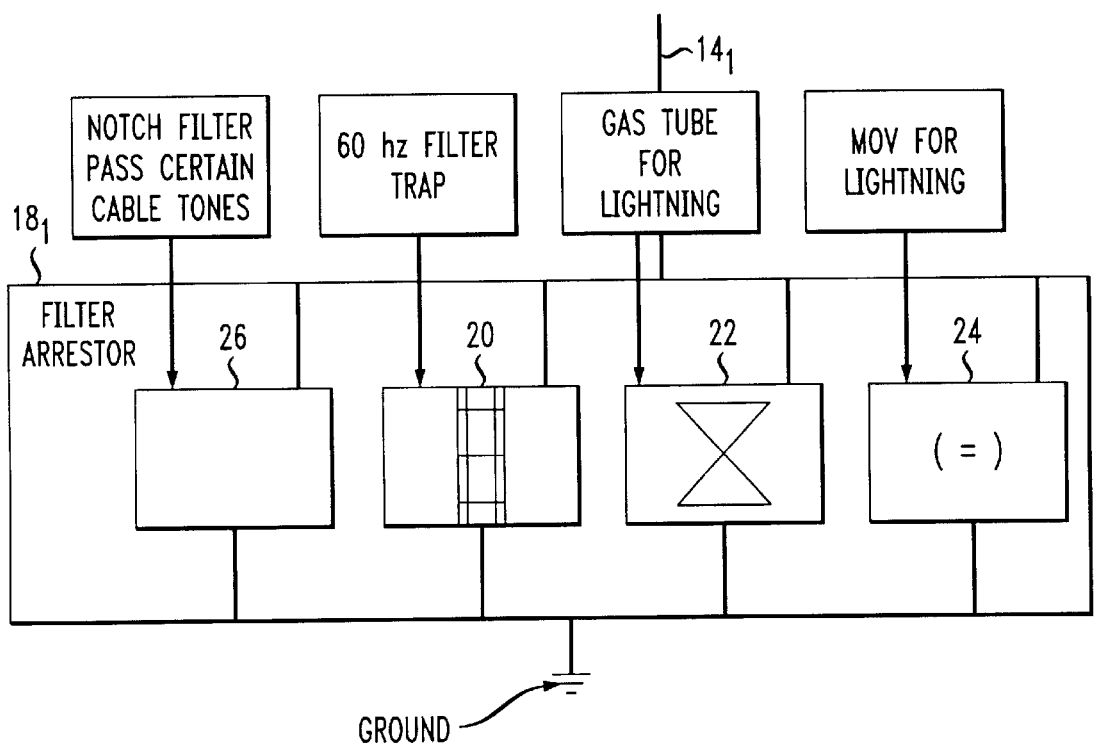
FIG. 2 illustrates the details of one of the filter arrestors of FIG. 1.

To best understand the manner in which each of the filter arrestors $18_1$–$18_6$ passes a particular frequency locating signal, reference should be had to FIG. 2, which illustrates the schematic details of the filter arrestor $18_1$. (The filter arrestors $18_2$–$18_6$ share the same design as the filter arrestor $18_1$.) As seen in FIG. 2, the filter arrestor $18_1$ includes the parallel combination of a 60 Hz. trap filter 20, a gas tube 22, and a Metal Oxide Varistor (MOV) 24. The 60 Hz. trap filer 20 serves to shunt 60 Hz. alternating current on the side leg cable $14_1$ to circuit ground, whereas the gas tube 22 and the MOV 24 act in concert to shunt to ground any high amplitude voltages caused by lightning.

In accordance with present principles, a notch filer 26 shunts the parallel combination of the 60 Hz. trap filter 20, the gas tube 22, and the MOV 24. The notch filter 26 serves to pass a particular frequency signal, and in that regard, only permits one of the plurality of locating signals on the backbone cable 12 to pass into the side leg cable $14_1$. In this way, each side leg cable, such as the side leg cable $14_1$, carries a single frequency locating signal that is independent of the locating signal on each of the other side leg cables. Thus, the strength of the locating signal on each side leg cable remains unaffected by the locating signals on the other side leg cables.

In the illustrated embodiment the cable locating signal generator 17 generates six separate cable locating signals $L_1$–$L_6$ as follows

| Signal | Frequency |
| --- | --- |
| $L_1$ | 163 Hz. |
| $L_2$ | 208 Hz. |
| $L_3$ | 220 Hz. |
| $L_4$ | 440 Hz. |
| $L_5$ | 500 Hz. |
| $L_6$ | 512 Hz. |

The notch filter 26 in each of the filter arrestors $18_1$–$18_6$ is tuned such that each filter arrestor passes a separate one the locating signals as follows:

| Filter Arrestor | Locating Signal Passed |
| --- | --- |
| $18_1$ | $L_1$ |
| $18_2$ | $L_2$ |
| $18_3$ | $L_3$ |
| $18_4$ | $L_4$ |
| $18_5$ | $L_5$ |
| $18_6$ | $L_6$ |

Depending on condition, other frequency signals could easily be substituted.

The foregoing describes a technique for locating, via electromagnetic signaling, each of plurality of short haul side leg) cables each connected to a long haul (backbone) cable.

The above-described embodiments merely illustrate the principles of the invention. Those skilled in the art may make various modifications and changes that will embody the principles of the invention and fall within the spirit and scope thereof. For example, while the present invention has been described in terms of locating short-haul (side leg) buried cables; it is equally useful for locating other types of short haul underground conveyances, such as buried pipes or the like.

What is claimed is:

1. A method for selectively applying a particular one of a plurality of different frequency conveyance-locating signals to each of a plurality of short-haul buried utility conveyances, each coupled between a common long haul buried utility conveyance and ground, comprising the steps of:

applying to the long haul conveyance the plurality of different frequency conveyance locating signals, and passively filtering, via a notch filter on each short haul conveyance, the plurality of different frequency locating signals to pass only a particular frequency locating signal unique to that short haul conveyance.

2. The method according to claim 1 further including the step of detecting the particular frequency locating signal passed on said each short haul cable to locate the cable.

3. The method according to claim 1 wherein the step of passively filtering the plurality of different frequency locating signals includes the step of coupling one end of the short haul conveyance to ground by a filter arrestor that includes the passive notch filter.

4. The method according to claim 1, wherein:

the step of applying to the long haul conveyance the plurality of different frequency conveyance locating signals includes the step of applying at least a first frequency conveyance locating signal and a second frequency conveyance locating signal; and the step of passively filtering the plurality of different frequency locating signals includes passing the first frequency locating signal on a first short haul conveyance, and passing the second frequency locating signal on a second short haul conveyance.

5. A method for locating each of a plurality of short-haul buried utility conveyances, each coupled between a common long haul buried utility conveyance and ground, comprising the steps of:

applying to the long haul conveyance a plurality of different frequency conveyance locating signals;

passively filtering, via a notch filter on each short haul conveyance, the plurality of different frequency locating signals to pass only a particular frequency locating signal unique to that short haul conveyance; and;

detecting the particular frequency locating signal passed on said each short haul conveyance to locate the conveyance.

6. Apparatus for selectively applying a particular one of a plurality of different frequency conveyance-locating signals to each of a plurality of short-haul buried utility conveyances, each coupled between a common long haul buried utility conveyance and ground, comprising:

a cable locating signal generator for applying to the long haul conveyance the plurality of different frequency conveyance locating signals, and a notch filter on each short haul conveyance for passing through that conveyance only a particular frequency locating signal unique thereto.

* * * * *